United States Patent [19]

Park

[11] Patent Number: 4,811,138
[45] Date of Patent: Mar. 7, 1989

[54] CASSETTE LOADING DEVICE OF VIDEO CASSETTE TAPE RECORDER

[75] Inventor: Jong D. Park, Seoul, Rep. of Korea

[73] Assignee: Gold Star Co., Ltd., Seoul, Rep. of Korea

[21] Appl. No.: 938,603

[22] Filed: Dec. 5, 1986

[30] Foreign Application Priority Data

Sep. 12, 1985 [KR] Rep. of Korea .................. 9246/1985

[51] Int. Cl.⁴ ............................................. G11B 5/008
[52] U.S. Cl. .................................... 360/96.5; 360/96.6
[58] Field of Search ...................... 360/96.5, 96.6, 90, 360/93, 85, 96.1

[56] References Cited

U.S. PATENT DOCUMENTS 3,394,898  7/1968  Laa ..................................... 360/96.6
3,766,327 10/1973  Johnson et al. ................... 360/96.6
4,686,593  8/1987  Watanabe et al. ................ 360/96.6

FOREIGN PATENT DOCUMENTS 2033642  5/1980  United Kingdom ................. 360/92

Primary Examiner—Robert S. Tupper
Assistant Examiner—Andrew L. Sniezek
Attorney, Agent, or Firm—Birch, Stewart, Kolasch & Birch

[57] ABSTRACT

A cassette loading device comprising a cassette holder having guide groove, a cover plate connected to the cassette holder by a connecting member which includes a guide groove, and a U-shaped leaf spring attached to the cover plate so that the cassette holder is provided with a large space in the vicinity of an opening thereof for advantageously and easily inserting and removing the tape cassette into and from the cassette holder.

4 Claims, 2 Drawing Sheets

CASSETTE LOADING DEVICE OF VIDEO CASSETTE TAPE RECORDER

FIELD OF THE INVENTION

The present invention relates to a loading device of a video cassette recorder, and more particularly to an improved loading device having a cassette holder in which a tape cassette may be advantageously and readily inserted into or removed from the cassette holder.

DESCRIPTION OF THE PRIOR ART

The prior art loading device having a cassette holder as shown in FIGS. 1 and 2, the cassette holder is fixed to a cover plate so that a distance between leading end of the cover plate and one upper end portion of the tape cassette being inserted is limited to a certain distance of l', and that distance between one lower end portion of the cassette being inserted and the upper end portion of front panel is limited to a certain distance of l''. Thus the distance of enabling the tape cassette to be inserted into or removed from the cassette holder is being limited to a distance of l. However, upon present-day tendencies of compactness in video cassette recorder, these limitations have induced many inconveniences on inserting or removing the tape cassette.

BRIEF SUMMARY OF THE INVENTION

It is therefore an object of this invention to provide a loading device having a cover plate of a cassette holder wherein a distance for inserting or removing of a tape cassette may be advantageously improved, without modifying the height of main body.

Therefore, the present invention comprises a cover plate detachably fixed to the cassette holder, a connecting member having a guide groove in which a guide pin is slidably secured to the cover plate, and a leaf spring substantially having a U-like configuration at the rear portion of the cover plate.

BRIEF DESCRIPTION OF THE DRAWINGS

The foregoing and other objects are effected by the invention as will be apparent from the following description and claims taken in connection with the accompanying drawings, forming a part of this application, in which:

BEST MODE OF CARRYING OUT THE INVENTION

Figure 3:
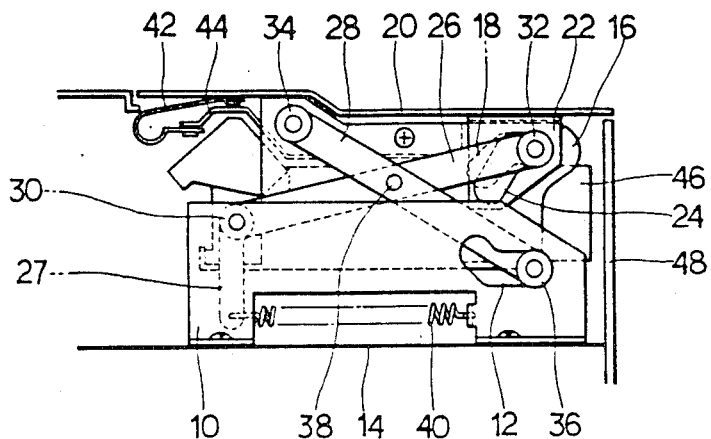
FIG. 3 is a longitudinal sectional view showing a cassette holder of the cassette loading device engaged with a bracket.
Figure 4:
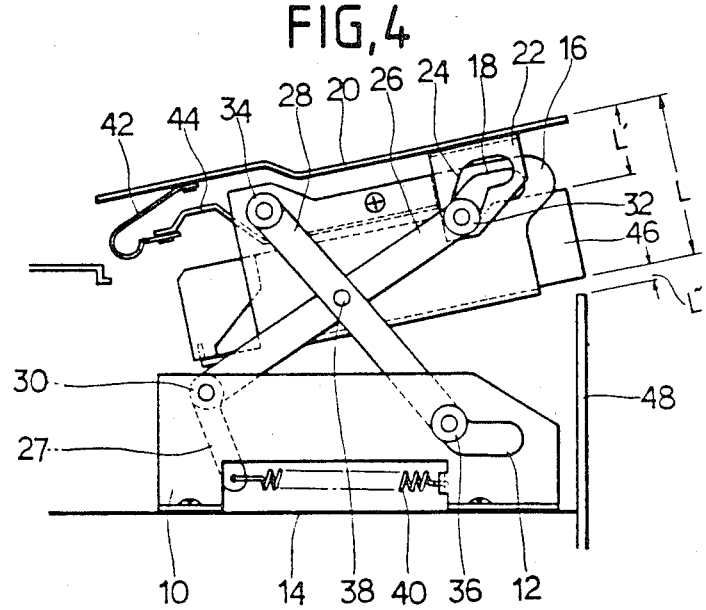
FIG. 4 is a longitudinal sectional view showing the cassette holder disengaged from the bracket.

Referring to FIGS. 3 and 4 illustrating the present invention, a bracket 10 having a guide groove 12 is secured on a base plate 14. A cassette holder 16 having a guide groove 18 is secured to a cover plate 20 by a connecting member 22 which includes a guide groove 24. There are two intercrossed levers 26 and 28 on the bracket 10 and the cassette holder 16, one lever 26 having a pivot pin 30 pivotably fixed on the bracket 10 at one end and a guiding pin 32 is operatively moved along the guide grooves 18 and 24 at the other end thereof. The other lever 28 having pivot pin 34 pivotably fixed on the cassette holder 16 at one end and a guiding pin 36 is operatively moved along the guide groove 12 at the other end thereof. These two levers are pivotably interconnected and intercrossed by a connecting pivot pin 38. The bracket 10 is provided with a coil spring 40 which is connected to an extended portion 27 of the lever 10 and adapted to upwardly urge the cassette holder 16 upon the cassette holder 16 being disengaged from the bracket 26.

Preferably, the cassette holder 16 of the present invention is apart from the cover plate 20 and is engaged with the cover plate 20 through the connecting member 22. There is indicated at 42 a U-shape leaf spring of which one end is secured to the cover plate 20 and the other end is secured to a fixing element 44.

Figure 1:
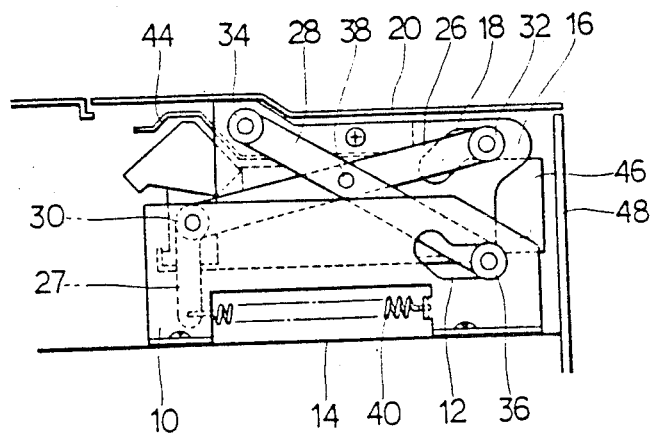
FIGS. 1 and 2 are a longitudinal sectional view showing a prior art cassette loading device.
Figure 2:
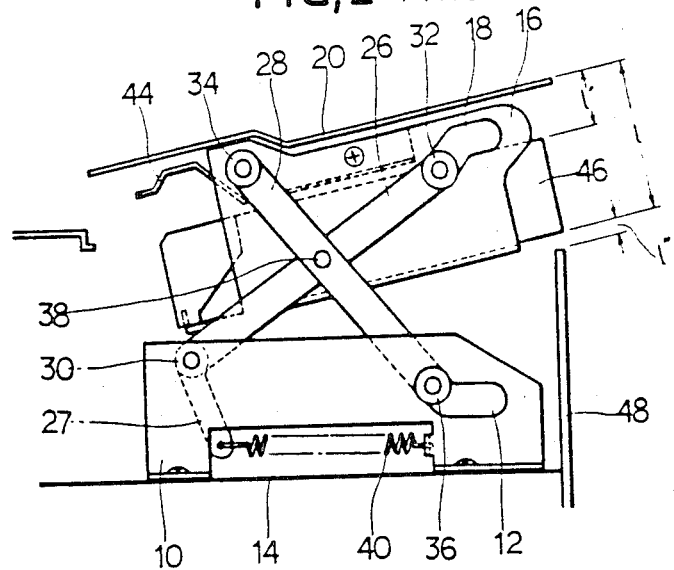

Accordingly, in case of the cassette holder 16 engaged with the bracket 10 as shown in FIG. 3, the height H of a main body may be maintained the same as that of the prior at (FIG. 1). And, in case of the cassette holder 16 disengaged from the bracket 10 as shown in FIG. 4, the cover plate 20 is intended to rise upwardly by the restoring force of the coil spring 40 untill the guiding pin 32 of the lever 26 reaches the lowermost edges of the downwardly inclined portions of the guide grooves 18 and 24. Thereby, the distance L' between the leading edges of the cover plate 20 and a tape cassette 46 being inserted is increased when compared with the prior art, as much as the lengths of the downwardly inclined portions of the guide grooves 18 and 24 are increased (FIG. 2). The reference numeral 48 designates a front pannel.

It should also be understood that the foregoing relates to only the scope of the invention is defined by the appended claims rather than by the description preceding them, and all changes that fall within meets and bounds of the claims, or equivalence of such meets and bounds are therefore intended to be embraced by the claims.

What is claimed is:

1. A cassette loading device of a video cassette tape recorder comprising:
   a housing,
   a bracket secured on said housing, said bracket including a coil spring at a rear portion and a first guiding groove disposed at a front portion thereof,
   a cassette holder movably mounted to said bracket for receiving and holding a tape cassette, said cassette holder including a second guiding groove disposed at a front portion thereof,
   a cover plate for covering said cassette holder
   a connecting member movably connecting to the front portion of said cassette holder to a front portion of said cover plate, said connecting member including a third guiding groove disposed thereon,
   a leaf spring connected between a rear portion of said cover plate and a rear portion of said cassette holder for biasing said cover plate away from said cassette holder, and
   a pair of intercrossing levers each having a first end and a second end pivotably connected to the center portion of said cassette holder through a central pivot pin, each intercrossing lever having a guiding pin at a first end thereof, one of said guiding pins moving along said first guiding groove and the other of said guiding pins moving along said second guiding groove together with said third guiding groove, the second end of one of said intercrossing levers being connected to the rear portion of said cassette holder through a first pivot pin and the second end of the other intercrossing lever being connected to said coil spring at second ends thereof through a second pivot pin, whereby, upon operating the cassette holder of the cassette loading device, the tape cassette is advantageously and readily inserted to and removed from the cassette holder.

2. The cassette loading device of claim 1, wherein, the first, second, and third guiding grooves have a V-shaped configuration, respectively, said first guiding groove facing said second and third guiding grooves.

3. The cassette loading device of claim 1, wherein the leaf spring has a U-shaped configuration.

4. The cassette loading device of claim 1, wherein one of the levers connected to the coil spring has a L-shaped configuration.

* * * * *